United States Patent
Arnold et al.

(10) Patent No.: US 10,127,199 B2
(45) Date of Patent: Nov. 13, 2018

(54) AUTOMATIC MEASURE OF VISUAL SIMILARITY BETWEEN FONTS

(71) Applicant: ADOBE SYSTEMS INCORPORATED, San Jose, CA (US)

(72) Inventors: R. David Arnold, Mountain View, CA (US); Zhihong Ding, Fremont, CA (US); Judy S. Lee, Los Altos, CA (US); Eric Muller, Los Altos, CA (US); Timothy Wojtaszek, Palo Alto, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 60 days.

(21) Appl. No.: 14/229,402

(22) Filed: Mar. 28, 2014

(65) Prior Publication Data
US 2015/0278167 A1    Oct. 1, 2015

(51) Int. Cl.
*G06F 17/21* (2006.01)
*G06F 17/22* (2006.01)
*G06K 9/68* (2006.01)

(52) U.S. Cl.
CPC ........ *G06F 17/214* (2013.01); *G06F 17/2211* (2013.01); *G06K 9/6828* (2013.01); *G06K 2209/01* (2013.01)

(58) Field of Classification Search
None
See application file for complete search history.

(56) References Cited

U.S. PATENT DOCUMENTS

| | | | | |
|---|---|---|---|---|
| 5,237,627 A * | 8/1993 | Johnson | ................... | G06K 9/48 382/198 |
| 5,689,620 A * | 11/1997 | Kopec | .................. | G06K 9/6256 382/157 |
| 5,754,187 A * | 5/1998 | Ristow | ................... | G06K 15/02 345/469 |
| 6,992,671 B1 * | 1/2006 | Corona | ..................... | G06T 9/20 345/467 |
| 7,519,221 B1 * | 4/2009 | Nicholson | ............. | G06T 11/203 382/180 |
| 7,522,760 B1 * | 4/2009 | Will | ......................... | G06K 9/18 382/101 |

(Continued)

*Primary Examiner* — Sumati Lefkowitz
*Assistant Examiner* — Jiangeng Sun
(74) *Attorney, Agent, or Firm* — Shook, Hardy & Bacon, L.L.P.

(57) ABSTRACT

The visual similarity between fonts is determined using visual descriptors of character images in the fonts. A model used to generate the visual descriptors may include a set of letterforms, keypoint locations on each letterform, and detail shapes at zero, one, or more detail areas on the letterform. In some instances, the model may also set forth one or more geometric measurements. Based on the model, a visual descriptor may be generated for a character image from a font by identifying a letterform of the character image, identifying keypoint locations on the character image, and identifying a detail shape at any detail areas on the character image. Additionally, the visual descriptor may include any geometric measurement defined by the model. The visual similarity between two fonts may be determined as a function of the differences between pairs of visual descriptors for the fonts that correspond with the same letterform.

19 Claims, 15 Drawing Sheets

(56) References Cited

U.S. PATENT DOCUMENTS

| | | | | |
|---|---|---|---|---|
| 8,403,221 B2* | 3/2013 | Nakamura | ............... | G06K 7/14 |
| | | | | 235/454 |
| 2009/0148043 A1* | 6/2009 | Ophir | ................. | G06K 9/00456 |
| | | | | 382/176 |
| 2015/0097842 A1* | 4/2015 | Kaasila | ................ | G06K 9/6215 |
| | | | | 345/471 |
| 2015/0134323 A1* | 5/2015 | Cuthbert | ............ | G06K 9/00442 |
| | | | | 704/3 |
| 2015/0220809 A1* | 8/2015 | Kawabata | ............... | G06T 7/001 |
| | | | | 382/195 |

* cited by examiner

FIG. 3.

AUTOMATIC MEASURE OF VISUAL SIMILARITY BETWEEN FONTS

BACKGROUND

With the advent of computers and digital typography, the number of different fonts has continued to grow. As a result, users often have wide flexibility in choosing fonts in various applications. Given the large number of available fonts, the task of identifying similar fonts has become more challenging. In particular, there are a number of scenarios in which it may be desirable to identify the similarity between two fonts or among a collection of fonts. For instance, given a picture containing text, a user may wish to find a font that is similar to the font in the image. As another example, a collection of fonts may be organized by visual similarity to facilitate a user selecting a font from the collection (as opposed to, for instance, simply listing fonts alphabetically). Furthermore, in instances in which a particular font is not available in an application, a user may wish to select another font that is visually similar to the unavailable font.

Some systems, such as the PANOSE system, have been developed for classifying fonts. However, such systems often use a limited amount and type of information that restricts their ability to identify similar fonts. Additionally, the systems are often applied subjectively. As a result of these and other limitations, such systems are often inadequate in sufficiently comparing fonts.

SUMMARY

This summary is provided to introduce a selection of concepts in a simplified form that are further described below in the Detailed Description. This summary is not intended to identify key features or essential features of the claimed subject matter, nor should it be used as an aid in determining the scope of the claimed subject matter.

Embodiments of the present invention relate to determining the visual similarity between fonts. The visual similarity of two fonts may be determined based on visual descriptors generated for character images in each font. Parameters of the visual descriptors may be defined by a model. The model may include a set of letterforms, keypoints on each letterform, detail shapes at zero, one, or more detail areas on each letterform, and geometric measurements to be made on character images. A visual descriptor for a character image may be generated using the model by identifying a corresponding letterform, identifying keypoint locations on the character image based on the letterform, identifying detail shapes at any detail area defined for the letterform, and performing any geometric measurements defined by the model. A similarity measure representing the visual similarity of the fonts may then be generated as a function of the differences between pairs of visual descriptors from the two fonts that correspond with the same letterform.

BRIEF DESCRIPTION OF THE DRAWINGS

The present invention is described in detail below with reference to the attached drawing figures, wherein:

FIG. 3 a diagram illustrating an example set of letterforms that may be used in a model in accordance with an embodiment of the present invention;

DETAILED DESCRIPTION

Figure 1:
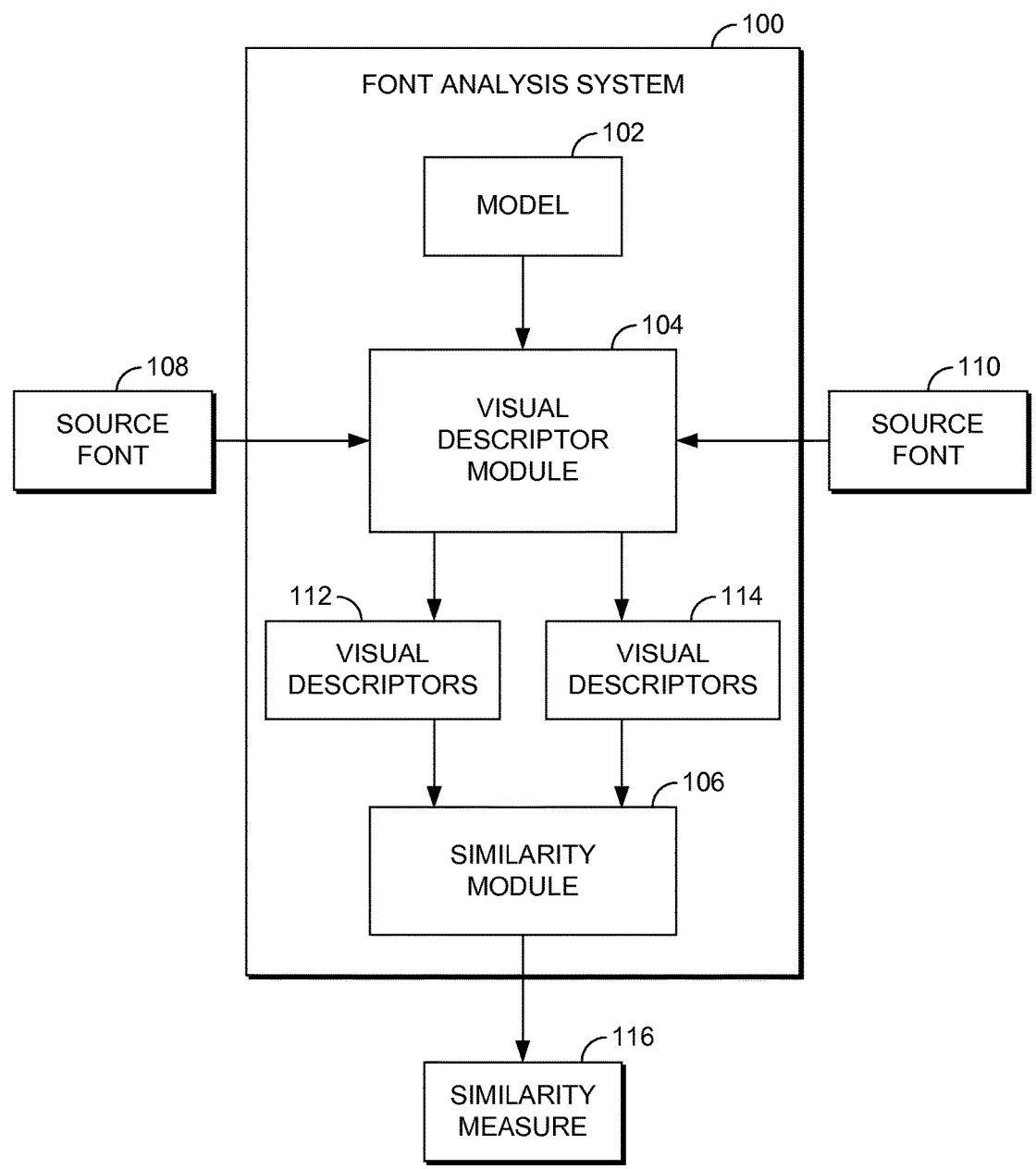
FIG. 1 is a block diagram showing a font analysis system for determining a visual similarity between fonts in accordance with an embodiment of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As noted in the Background, a number of systems have been developed for classifying fonts. The PANOSE system is one example. However, systems such as the PANOSE system typically fall short in their usefulness in comparing the visual similarity between fonts, especially when given a large number of fonts. This is partly because such systems were developed primarily for comparing known fonts. The amount and type of information regarding fonts used by these systems for comparison purposes is often limited, which restricts their ability to discriminate among a large set of fonts. Additionally, while the systems are described in objective terms, application is often subjective, further limiting their ability to accurately identify similar fonts.

Embodiments of the present invention are generally directed to objectively measuring the visual similarity between fonts. A model may be employed by the system to automatically generate visual descriptors of character images of fonts. As used herein, the term "character image" refers to a specific instance or rendering of a character in a font. The term "character" is used herein to represent the general concept of a letter, number, symbol, ideograph, or the like. The similarity between two fonts may be measured by comparing the visual descriptors of character images from the fonts. The visual descriptors may be computed from a rendering of the font, as opposed to digital font bits. The visual descriptors are rich enough to capture many details and to distinguish very similar fonts. This is useful when the measure of similarity is applied in the context of a large collection of fonts. Furthermore, the visual descriptors focus on aspects that are visible, and these aspects are weighed when comparing fonts to better approximate human judgment in visual similarity. While the visual descriptors are rich enough to capture many details, they are also small enough to be easily compared when determining similarity. Furthermore, the visual similarity of two fonts may be measured even in instances in which only some characters are available for each font. As such, embodiments are well suited for a number of applications in which the visual similarity of fonts is being compared.

In accordance with embodiments of the present invention, a model may be generated that defines parameters of visual descriptors. The model includes a set of letterforms. As used herein, the term "letterform" refers to a prototypical shape of a character. Generally, the letterforms are prototypical in the sense that details, such as thickness of stems or serif shapes, are abstracted. The model may include multiple letterforms for a particular character. The model also defines the location of a number of model keypoints on each letterform. The model keypoints may be selected for a letterform by identifying significant points on the letterform that help define the shape of the letterform. As such, the model keypoints capture the overall geometry of a letterform. The model may also define zero, one, or more detail areas on the letterform for examining a shape of an outline of a character image. The model may also set forth a number of detail shape options available for each detail area. The model may further define one or more geometric measurements to be made.

A visual descriptor for a character image from a font may be generated using the model. The visual descriptor for a character image may be generated by identifying, from a set of letterforms in the model, a letterform corresponding with the character image. Additionally, the location of keypoints on the character image may be determined based on the location of model keypoints defined on the letterform by the model. Based on any detail areas and detail shapes defined for letterform in the model, the outline at one more areas on the character image may be analyzed to identify a detail shape of the outline at each area. Further, any geometric measurement defined by the model may be made on the character image. Thus, the visual descriptor for the character image may include information that identifies the letterform, location of keypoints, detail shapes, and geometric measurements.

The visual similarity between two fonts may be determined by computing a similarity measure based on the visual descriptors for the two fonts. Generally, a distance may be determined between each pair of visual descriptors from the fonts that correspond with the same letterform. For instance, the visual descriptor for a character image of an uppercase "A" letterform in the first font may be compared against the visual descriptor for a character image of an uppercase "A" letterform in the second font. The similarity measure for the two fonts may then be computed based on the collection of distances between visual descriptors of the same letterform from the two fonts.

Accordingly, in one aspect, an embodiment of the present invention is directed to a non-transitory computer storage medium comprising computer-useable instructions that, when used by one or more computing devices, cause the one or more computing devices to perform operations. The operations include identifying a letterform of a character image, the letterform being selected from a set of letterforms defined by a model. The operations also include determining locations of keypoints on the character image based on a set of model keypoints defined on the letterform in the model. The operations further include determining a detail shape at each of one or more areas of the character image corresponding with one or more detail areas defined for the letterform in the model. The operations still further include generating a visual descriptor for the character image that contains information regarding the letterform, the locations of the keypoints, and the one or more detail shapes.

In another embodiment of the invention, an aspect is directed to a computer-implemented method. The method includes identifying, by a computing device, a first visual descriptor and a second visual descriptor as corresponding with a same letterform. The first visual descriptor represents a first character image from a first font and includes information regarding the letterform, locations of keypoints on the first character image, and a detail shape at each of one or more detail areas on the first character image. The second visual descriptor represents a second character image from a second font and includes information regarding the letterform, locations of keypoints on the second character image, and a detail shape at each of one or more detail areas on the second character image. The method also includes computing a similarity measure for the first visual descriptor and the second visual descriptor based on the information regarding the locations of keypoints on the first character image and the second character and the detail shape at each of the one or more areas on the first character image and the second character image.

A further embodiment is directed to a computerized system comprising: one or more processors; and one or more computer storage media storing computer-useable instructions that, when used by the one or more processors, cause the one or more processors to: generate a first set of visual descriptors for a plurality of character images from a first font, at least one visual descriptor in the first set of visual descriptors corresponding with a character image from the first font and including information regarding a letterform of the character image, locations of keypoints on the character image, and a detail shape at each of one or more areas on the character image; generate a second set of visual descriptors for a plurality of character images from a second font, at least one visual descriptor from the second set of visual descriptors corresponding with a character image from the second font and including information regarding a letterform of the character image, locations of keypoints on the character image, and a detail shape at each of one or more areas on the character image; compute distances between visual descriptors from the first set of visual descriptors and the second set of visual descriptors that correspond with a same letterform; and compute similarity measure for the first font and the second font as a function of the distances between the visual descriptors from the first set of visual descriptors and the second set of visual descriptors.

Referring now to FIG. 1, a block diagram is provided that illustrates a font analysis system 100 for comparing the visual similarity of fonts in accordance with an embodiment of the present invention. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory. The font analysis system 100 may be implemented via any type of computing device, such as computing device 1500 described below with reference to FIG. 15, for example. In various embodiments, the font analysis system 100 may be implemented via a single device or multiple devices cooperating in a distributed environment.

The font analysis system 100 generally operates to compare the visual similarity of fonts. As shown in FIG. 1, the font analysis system 100 includes a visual descriptor module 104 that generates visual descriptors of fonts using a model 102. While only a single model is shown in FIG. 1, it should be understood that the font analysis system 100 may employ any number of models. For instance, different models may be established for different alphabets (e.g., Latin, Greek, Cyrillic, etc.) or other writing systems (e.g., syllabaries, logographies, etc.). As will be described in further detail below, the model 102 includes a set of letterforms. Additionally, the model identifies a number of model keypoints on each letterform. The model further defines zero, one, or more detail areas on each letterform and detail shape options for each detail area. The model may also set forth one or more geometric measurements, which may be defined independently of the letterforms. By way of example only and not limitation, the geometric measurements may include italic angle, width, density, contrast, and topology.

Based on the model 102, the visual descriptor module 104 generates visual descriptors of character images of input fonts. For instance, FIG. 1 illustrates the font analysis system 100 generating visual descriptors 112 for a first font 108 and visual descriptors 114 for a second font 110. The fonts 108 and 110 may come from any of a variety of different sources. By way of example only and not limitation, an input font may be text in an image. In such instances, the input font may include only a limited number of characters. In other instances, the input font may include a complete set of characters, such as in the case of a digital font, which may also include metadata regarding the font.

As will be described in further detail below, the visual descriptor module 104 may generate a visual descriptor for a given character image by identifying, from the set of letterforms defined by the model 102, a letterform that corresponds with the character image. Additionally, the visual descriptor module 104 may identify the locations of keypoints on the character image based on the model keypoints defined for the identified letterform. The visual descriptor module 104 may further analyze areas of the character image corresponding with detail areas defined for the letterform by the model 102 to identify a detail shape for each area. The visual descriptor module 104 may further compute geometric measurements defined by the model 102. Accordingly, the visual descriptor for the character image may include information identifying the letterform, locations of keypoints on the character image, detail shapes for each detail area on the character image, and any geometric measurement made on the character image. The set of visual descriptors for an input font may include a visual descriptor for each of one or more character images in that font. As noted above, this may include either a full or partial set of characters.

It should also be noted that the visual descriptor module 104 may generate visual descriptors for two fonts at different points in time. For instance, one font may be analyzed by the visual descriptor module 104 at a first point in time and the resulting visual descriptors for that font may be stored for future comparison against the visual descriptors of another font. In some embodiments, a library of visual descriptors may be generated that includes visual descriptors for a number of different fonts.

The similarity module 106 operates to determine the visual similarity between two fonts based on the visual descriptors for the fonts. For instance, FIG. 1 illustrates the similarity module 106 determining a similarity measure 116 based on the visual descriptors 112 generated for the first font 108 and the visual descriptors 114 generated for the second font 110. As such, the similarity measure 116 represents the visual similarity between the first font 108 and the second font 110. The similarity module 106 may identify pairs of visual descriptors from the visual descriptors 112 and 114 that correspond with the same letterform and compute a similarity measure for each corresponding pair of visual descriptors. The similarity measure for a corresponding pair of visual descriptors may be computed based on distances between parameters of the visual descriptors (e.g., keypoint locations, detail shapes, geometric measurements). The similarity measure 116 between the two fonts may then be computed as a function of the similarity measures between corresponding visual descriptors.

Figure 2:
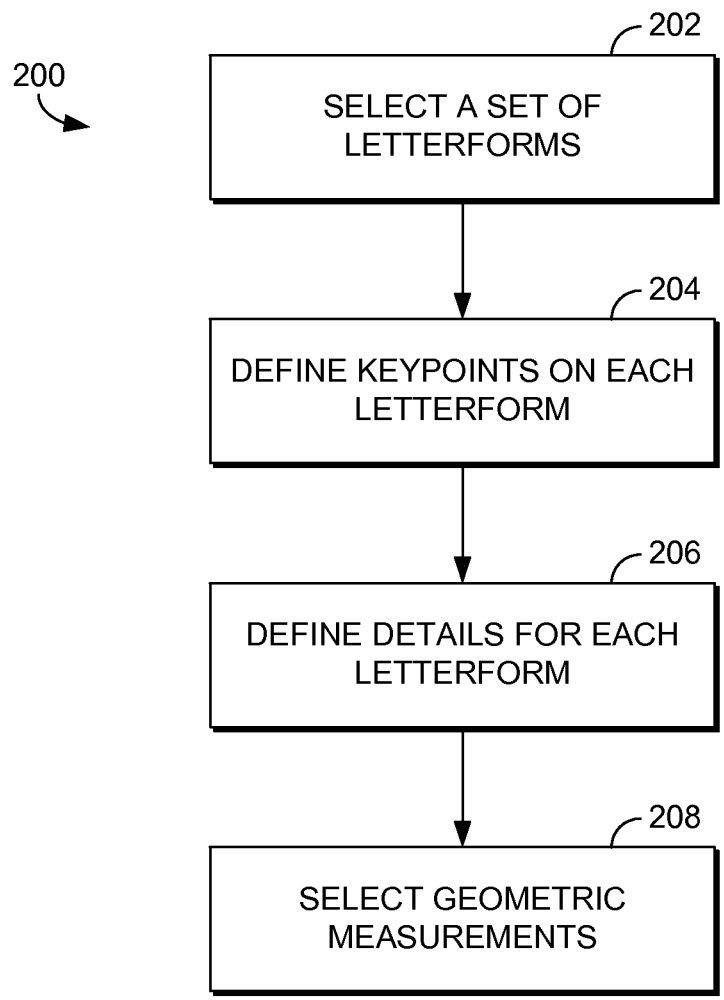
FIG. 2 is a flow diagram showing a method for generating a model for use in identifying a visual similarity between fonts in accordance with an embodiment of the present invention.

Turning now to FIG. 2, a flow diagram is provided that illustrates a method 200 for generating a model that may be employed to determine the similarity between fonts in accordance with an embodiment of the present invention. For instance, the method 200 may be employed to generate the model 102 of FIG. 1. As shown at block 202, a set of letterforms may initially be selected for the model. As indicated previously, letterforms are prototypical shapes of characters. Generally, the letterforms are prototypical in the sense that details, such as thickness of stems or serif shapes, are abstracted.

An example of a set of letterforms that may be selected for the Latin alphabet is shown in FIG. 3. As can be seen in FIG. 3, a character in the Latin alphabet may be represented with one or more letterforms. For instance, only a single letterform is included for the letter "u." This letterform may be used for both the uppercase and lowercase "u." On the other hand, two letterforms are included for the letter "b," including a letterform for the uppercase "B" and a letterform for the lowercase "b." Some characters may have even more letterforms. For instance, the letter "a" has three letterforms in the present example. In particular, a letterform is include for the uppercase "A" and two letterforms are included for the lowercase "a," to distinguish between a single-story lowercase "a" and a double-story lower case "a."

Figure 4A:
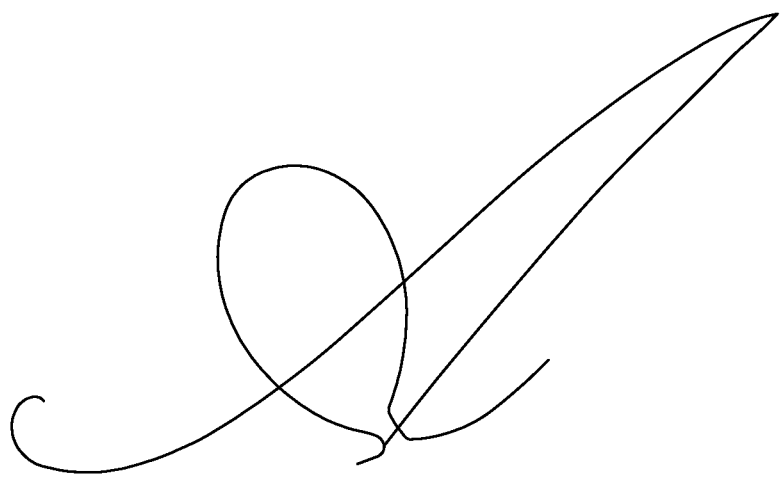
FIGS. 4A and 4B are diagrams illustrating examples of cursive font letterforms that may be used in a model in accordance with an embodiment of the present invention.
Figure 4B:
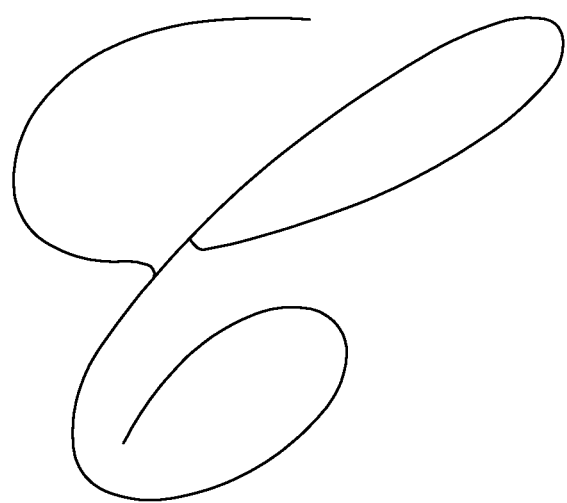

The set of letterforms can also be adapted to different types of fonts. For instance, the set of letterforms shown in FIG. 3 is appropriate for standard text faces. To compare cursive fonts, additional letterforms could be added for cursive shapes. For instance, FIG. 4A illustrates a letterform for a cursive uppercase "A," and FIG. 4B illustrates a letterform for a cursive uppercase "C." Additionally, although the example set of letterforms shown in FIG. 3 is directed to the Latin alphabet, it should be understood that letterforms may be selected for characters for any alphabet (e.g., Greek, Cyrillic, etc.) or other forms of writing systems (e.g., syllabaries, logographies, etc.).

Returning to FIG. 2, a set of model keypoints is defined on each letterform, as shown at block 204. Generally, the model keypoints may be selected for a letterform by identifying significant points on the letterform that help define the shape of the letterform. As such, the model keypoints capture the overall geometry of a letterform.

The location of the model keypoints for a letterform in one embodiment may be measured relative to the width of the letterform (i.e., in the horizontal direction) and to the height of the letterform (i.e., in the vertical direction). Thus, a point in the lower left corner has the coordinates (0,0), and a point in the top right corner has the coordinates (1,1). This coordinate system is invariant by stretching in each direction. It should be understood that this coordinate system is provided by way of example only and other coordinate systems may be employed to record the location of keypoints in accordance with various embodiments of the present invention.

Figure 5:
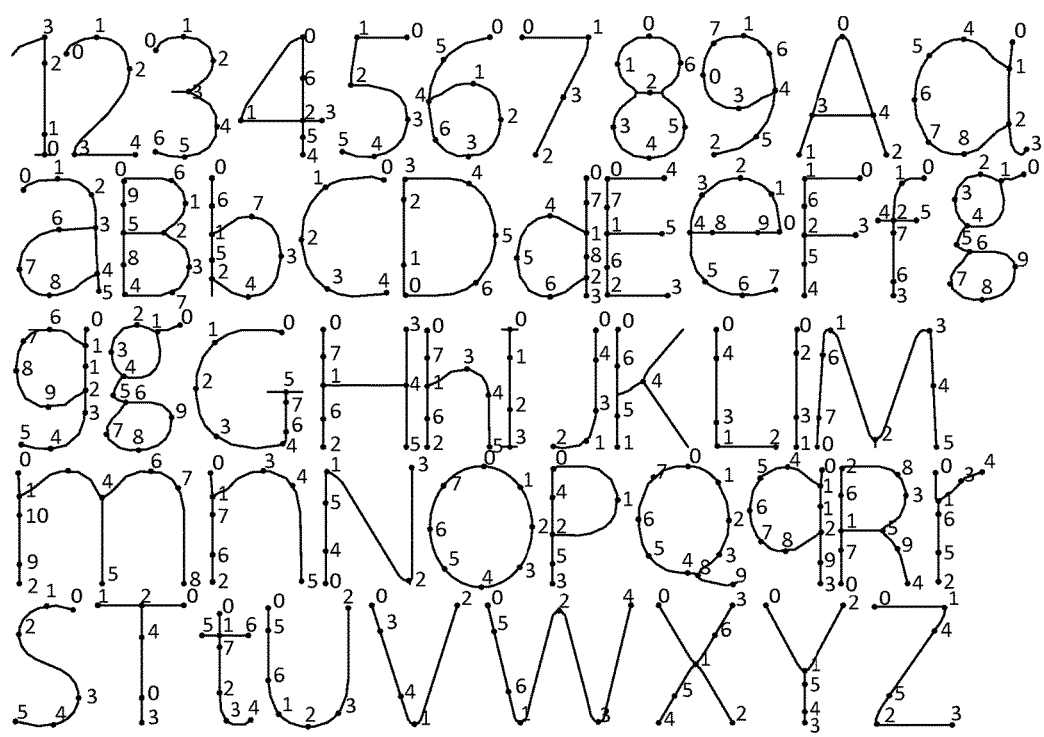
FIG. 5 is a diagram illustrating an example set of letterforms with keypoints that may be used in a model in accordance with an embodiment of the present invention.

FIG. 5 illustrates an example of model keypoints on the set of letterforms previously shown in FIG. 3. As can be seen in FIG. 5, each letterform may have a different number of model keypoints. For instance, the lowercase "l" includes four keypoints, while the two-story lowercase "a" includes 9 keypoints. Also, the ordering of keypoints need not be correlated between different letterforms.

Returning to FIG. 2, the process also includes selecting details regarding the outline of each letterform, as shown at block 206. While the letterforms capture the overall geometry of characters, it is also useful to capture details regarding the outline of character images. For each letterform, zero, one, or more areas of the letterform at which the outline is potentially distinctive are identified as detail areas. Often, these detail areas are extremities of the letterforms. In addition to identifying detail areas, the various forms or shapes that each detail area can take are also selected. The detail shape represents the form of the outline of a character image at a detail area.

Figure 6A:
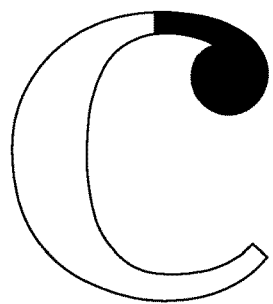
FIGS. 6A-6H are diagrams illustrating examples of detail shapes on a detail area of a letterform that may be used in a model in accordance with an embodiment of the present invention.
Figure 6B:
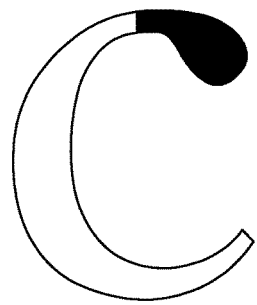
Figure 6C:
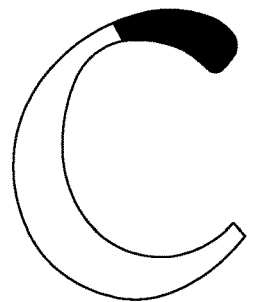
Figure 6D:
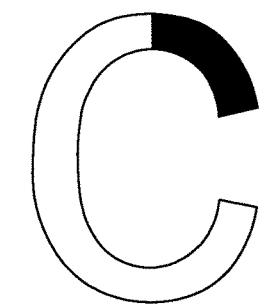
Figure 6E:
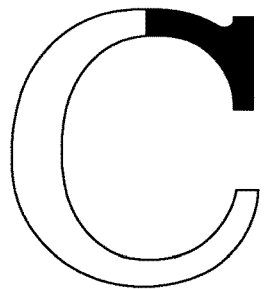
Figure 6F:
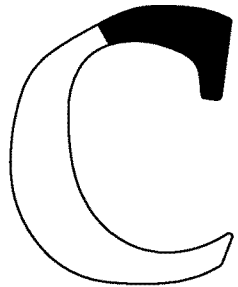
Figure 6G:
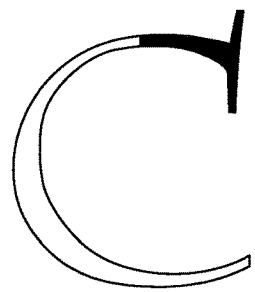
Figure 6H:
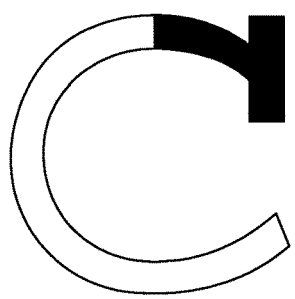

By way of example to illustrate, FIGS. 6A-6H illustrate examples of detail shapes that can be assigned to the upper right area of the letterform "C." The area of interest (i.e., detail area) is shown bolded in each example. In particular, FIG. 6A illustrates a "round with inflexion" detail shape. FIG. 6B illustrates a "round without inflexion" detail shape. FIG. 6C illustrates a "one corner" detail shape. FIG. 6D illustrates a "two corners" detail shape. FIG. 6E illustrates an "outside serif" detail shape. FIG. 6F illustrates an "inside serif" detail shape. FIG. 6G illustrates an "outside and inside serif" detail shape. FIG. 6H illustrates a "slab serif" detail shape. Accordingly, the set of detail shape options defined in a model for the upper right detail area of the letterform "C" may include the detail shapes shown in FIGS. 6A-6H. It should be understood that the detail shapes provided in FIGS. 6A-6F are provided by way of example only and any number of detail shapes may be provided for the upper right area of the letterform "C." Additionally, different areas of different letterforms may have different detail shape options.

As can be understood, multiple areas of a letterform may be identified as detail areas. For instance, the bottom of each of the three vertical stems of the lowercase "m" could be selected as detail areas for that letterform. In some embodiments, the location of each detail area of a letterform may be defined using the model keypoints for that letterform. For example, in the instance of the upper right area of the letterform "C," the location of the detail area may be defined by keypoints 0 and 1. As another example, in the case of the lowercase "m," the three detail areas corresponding with the three vertical stems may be defined by the following pairs of points: 9 and 2; 4 and 5; and 7 and 8.

To allow for comparison of similarity among font details, a distance between detail shapes may be defined. Since the detail shapes are categorical, in one embodiment, this may include a two-dimensional matrix indexed by detail shape in which each entry provides for the distance between two detail shapes. It should be understood that this approach is provided by way of example only and other approaches may be employed to allow for determining the difference between detail shapes that corresponds with the visual similarities of the different detail shapes.

Turning back to FIG. 2, the model may also be generated by selecting a number of geometric measurements to be used, as shown at block 208. Any number of different geometric measurements may be selected for inclusion in a model within the scope of embodiments of the present invention. In some instances, no geometric measurements may be included in the model. By way of example only and not limitation, one geometric measurement that may be employed is the italic angle. In some embodiments, the italic angle may be determined using keypoints. For instance, a pair of keypoints may be selected for each letterform for use in italic angle measurement. By way of example to illustrate, keypoints 3 and 4 could be selected to measure the italic angle of the two-story lowercase "a" letterform, keypoints 6 and 7 could be used for the lowercase "h" letterform, while an italic measurement may not be defined for the letterform "o."

Other geometric measurements that may be included within the model include, for instance, width, density, contrast, and topology. Width of a character image may be determined relative to height. For instance, the width may be measured from a left-most pixel to a right-most pixel of the character image, and the height may be measured from a top-most pixel to a bottom-most pixel of the character image. This parameter may be useful in distinguishing fonts that differ by width (e.g., compressed, regular, expanded, etc.).

Density may generally reflect the thickness of the strokes of a character image and may be measured as the ratio of black pixels to total area of the character image. In this sense, a character image is viewed as a binary image containing only black and white pixels (i.e., no grayscale). Generally, the total area of a character image may be a bounding box around the width and height of the character image. The density parameter may be useful in distinguishing fonts that differ by weight (e.g., light, regular, semi-bold, bold, heavy, etc.). In some embodiments, a weight measurement that attempts to find an actual stroke width may be used in place of density. However, density may be easier to determine and therefore may facilitate efficient processing.

Contrast is an approximation of the variation of the stroke width of a character image. It may be determined as an estimation of the ratio between the stroke width of the thickest part of a character image and the stroke width of the thinnest part of the character image. The contrast reflects that some character images could have the same width and density but may vary in thickness along the path of the character and therefore look different.

Topology measures the number of fills and holes on a character image. A fill is an area of touching black pixels, and a hole is an area of touching white pixels. This parameter may serve to distinguish between, among other things, ordinary typefaces, open typefaces, and highly decorative typefaces.

It should be understood that the geometric measurements discussed above are provided by way of example only and not limitation. Some or all of the above-discussed geometric measurements may be omitted and other geometric measurements may be included within a model within the scope of embodiments of the present invention.

Figure 7:
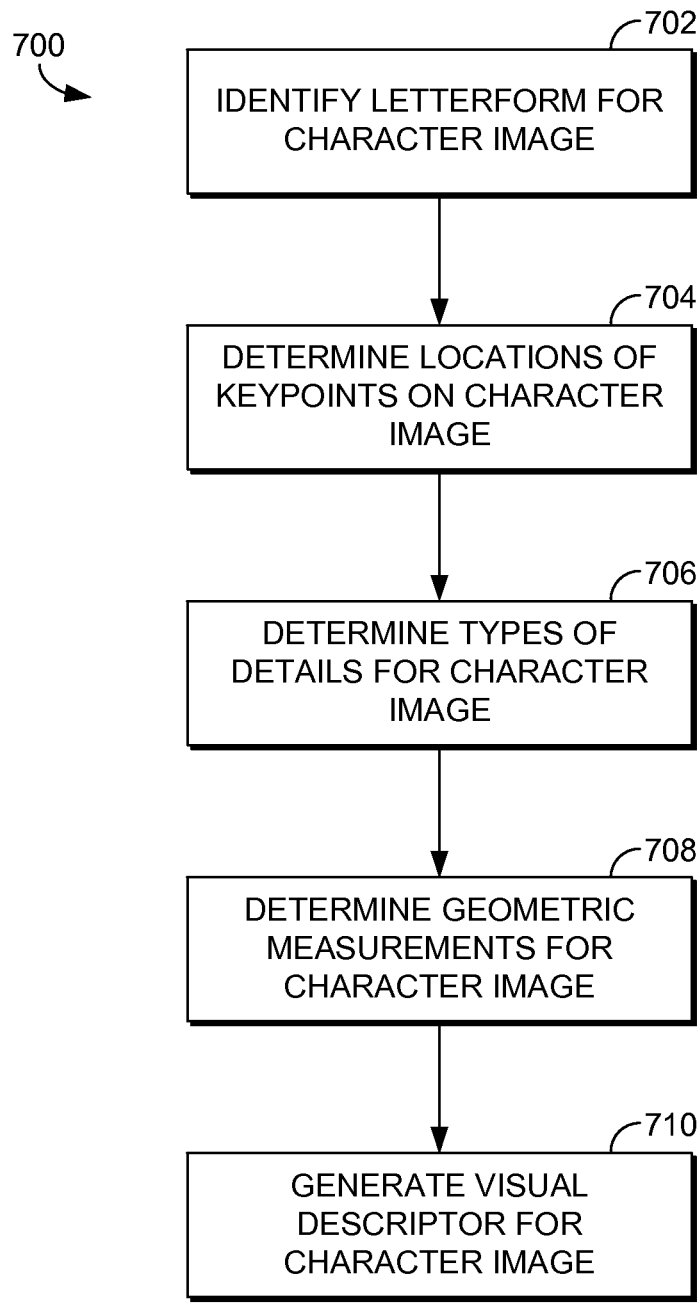
FIG. 7 is a flow diagram showing a method for generating a visual descriptor for a character image in accordance with an embodiment of the present invention.
Figure 8A:
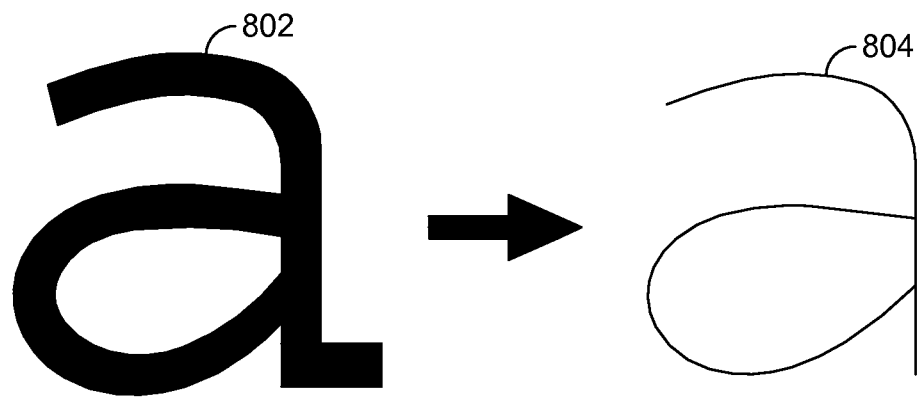
FIGS. 8A and 8B are diagrams illustrating examples of identifying letterforms for character images in accordance with an embodiment of the present invention.
Figure 8B:
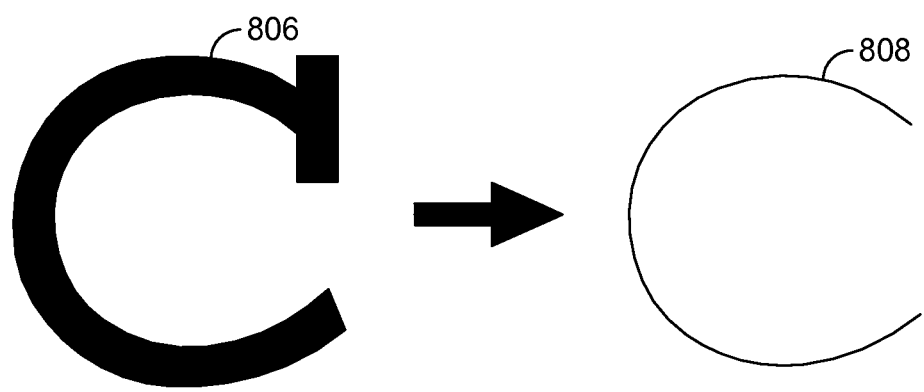

Referring next to FIG. 7, a flow diagram is provided that illustrates a method 700 for determining a visual descriptor for a character image using a model in accordance with an embodiment of the present invention. The method 700 may be performed, for instance, by the visual descriptor module 104 of FIG. 1. Initially, as shown at block 702, the letterform corresponding with the character image is identified. In particular, given a character image, the closest letterform for the character image is identified. By way of example to illustrate, given the character image 802 shown in FIG. 8A, the letterform 804 of a two-story lowercase "a" may be identified. As another example, given the character image 806 shown in FIG. 8B, the letterform 808 of a "c" may be identified.

The letterform of an input character image may be determined using any of a variety of different techniques in accordance with various embodiments of the present invention. By way of example only and not limitation, in one embodiment, machine-learning approaches may be employed to identify a letterform for a character image. For instance, neural networks could be trained using the model's set of letterforms and various character images, and the neural networks may then be employed to identify letterforms for input character images.

As another example, optical character recognition (OCR) could be used together with machine learning. The OCR step may determine if the character image is a particular letter, number, or other type of symbol (e.g., A/a, B/b, C/c, etc.). The machine learning step may then further refine this determination to distinguish between the various letterforms that the identified letter, number, or other symbol may take. In instances in which a digital font is being analyzed, the OCR step could be replaced by using information (i.e., metadata) contained in the font.

Referring again to FIG. 7, after identifying the letterform of the character image, the locations of keypoints are determined on the character image, as shown at block 704. The locations of the keypoints for the character image are determined based on the location of the model keypoints on the identified letterform. For instance, if a character image is determined to correspond with the two-story lowercase "a" letterform, which includes nine model keypoints, the location of nine keypoints are determined on the character image.

Figure 9A:
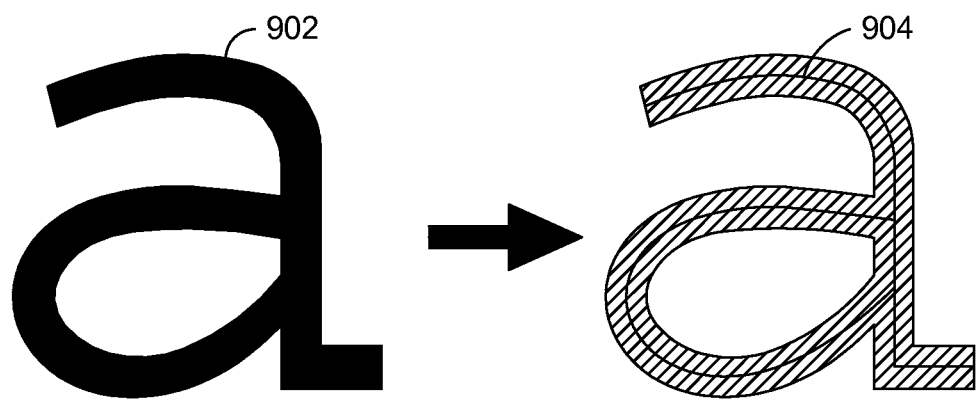
FIGS. 9A and 9B are diagrams illustrating examples of extracted skeletons of character images in accordance with an embodiment of the present invention.
Figure 9B:
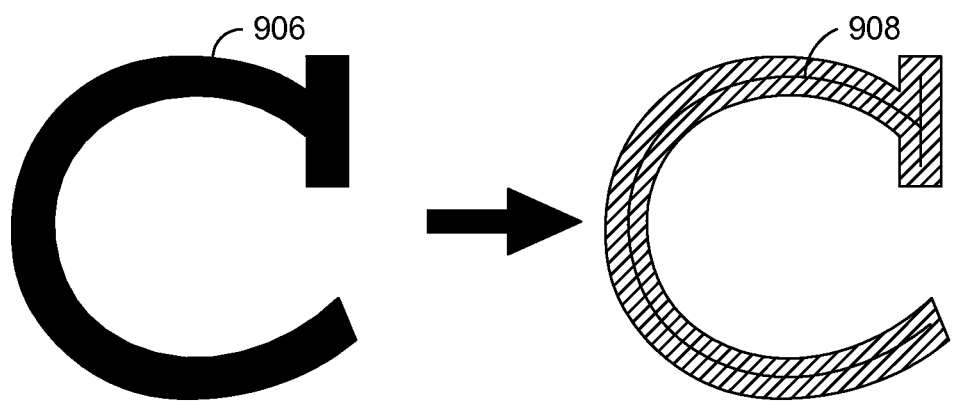

In some embodiments, keypoints may be determined for a character image by first extracting a topological skeleton using any known algorithm for skeleton extraction. For instance, FIG. 9A illustrates a skeleton 904 extracted for a character image 902 that corresponds with a two-story lowercase "a" letterform. FIG. 9B illustrate a skeleton 908 extracted for a character image 906 that correspond with a "c" letterform.

Figure 10A:
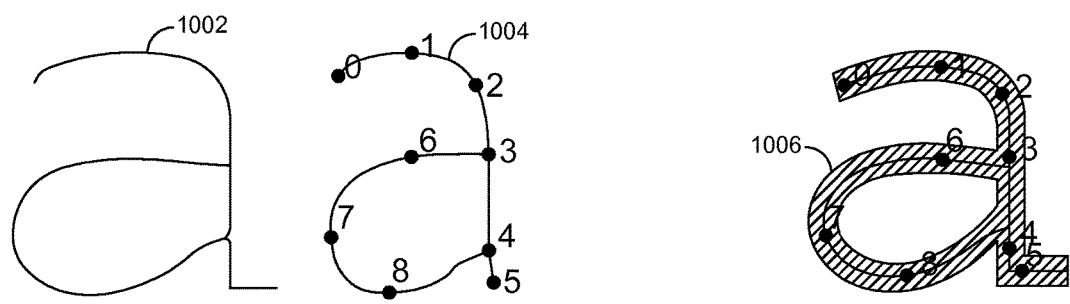
FIGS. 10A and 10B are diagrams illustrating examples of identifying keypoints on the skeletons of character images in accordance with an embodiment of the present invention.
Figure 10B:
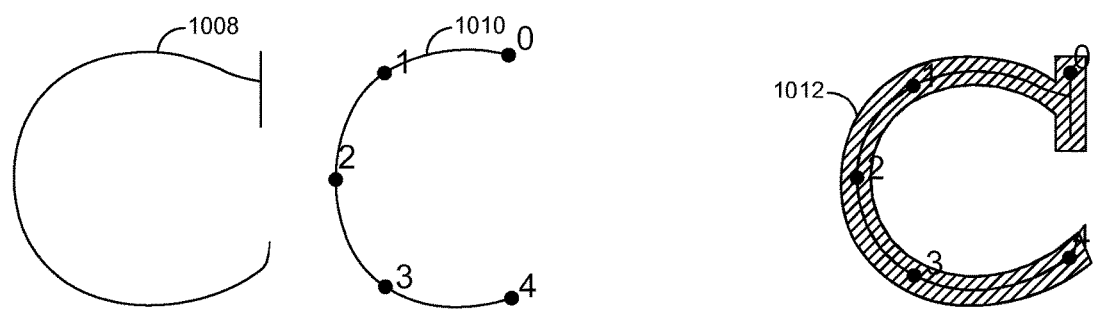

Keypoints may then be identified along the skeletons. For instance, among points along the skeleton of the character image, the points that best match the location of the model keypoints of the corresponding letterform are identified. For instance, FIG. 10A illustrates a skeleton 1002 extracted for a character image corresponding with the two-story lowercase "a" letterform 1004. Based on the location of the model keypoints on the letterform 1004, keypoints are located along the skeleton of the character image 1006. Similarly, 10B illustrates a skeleton 1008 extracted for a character image corresponding with the two-story lowercase "a" letterform 1010. Based on the location of the model keypoints on the letterform 1010, keypoints are located along the skeleton of the character image 1012.

By way of example only and not limitation, one approach for identifying the location of keypoints on a skeleton may include employing known shape context techniques. For instance, one implementation may include computing shape contexts $s_1, s_2, \ldots, s_n$ or the n model keypoints on the letterform (considered as an image), to compute shape contexts $A_1, A_2, \ldots, A_p$ for the p points in the skeleton of the character image, and then to select among those p points, the n points with shape contexts most similar to those on the letterform.

Figure 11A:
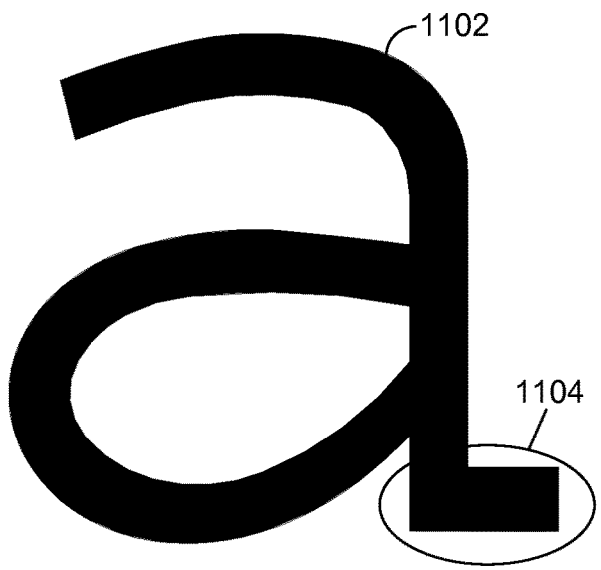
FIGS. 11A and 11B are diagrams illustrating examples of determining detail shapes of detail areas on character images in accordance with an embodiment of the present invention.
Figure 11B:
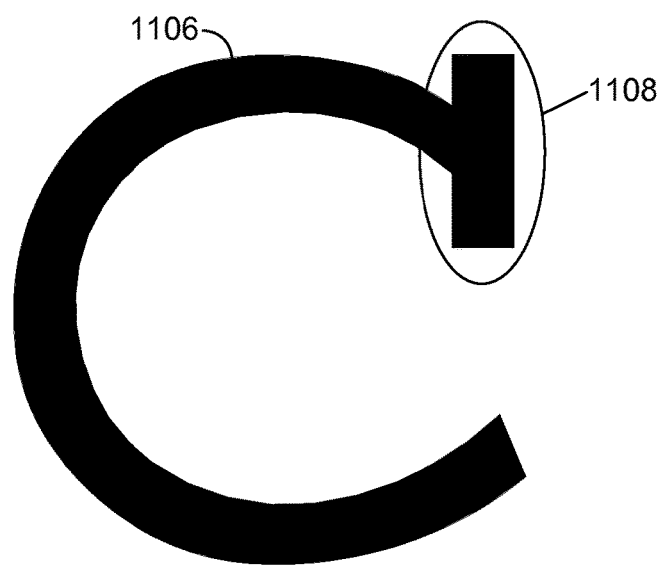

Turning back to FIG. 7, the type of detail shapes included on the character image are determined, as shown at block 706. As discussed above, each letterform in a model may include zero, one, or more areas at which detail shapes are examined. In some embodiments, these detail areas may be defined based on the location of model keypoints. Additionally, each detail area of a letterform may have a number of different detail shape options in the model. Accordingly, areas of the character image are identified based on the detail areas defined in the model for the letterform corresponding with the character image. Each area is then analyzed to determine a detail shape on the character image based on available detail shape options in the model. For instance, FIG. 11A illustrates a character image 1102 corresponding with the two-story lowercase "a" letterform, for which a detail area 1104 is located on the bottom right. Analysis of this area 1104 of the character image 1102 indicates that the area 1104 has a "two corners" detail shape. As another example, FIG. 11B illustrates a character image 1106 corresponding with the "c" letterform, for which a detail area 1108 is located on the top right. Analysis of this area 1108 of the character image 1106 indicates that the area 1108 has a "slab serif" detail shape.

Analysis of a character image to determine the detail shapes on the character image may be performed in a variety of different manners in accordance with embodiments of the present invention. Initially, one or more areas of the character image are identified based on one or more detail areas defined in the model for the letterform corresponding with the character image. In some embodiments, a detail area may be defined in a model based on the location of model keypoints on the letterform. Accordingly, a corresponding area of a character image may be identified based on keypoints identified for the character image, as discussed above with reference to block 704.

Figure 12A:
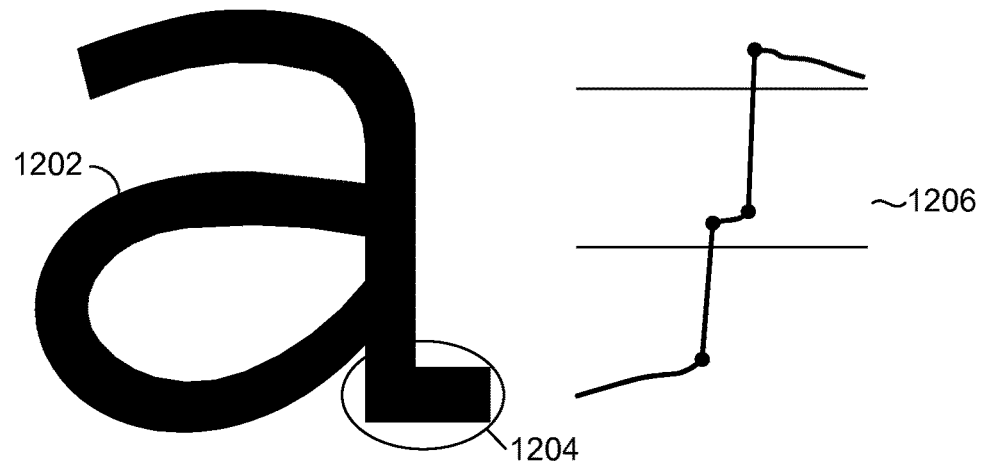
FIGS. 12A and 12B are diagrams illustrating tangent directions used to determine the detail shapes of detail areas on character images in accordance with an embodiment of the present invention.
Figure 12B:
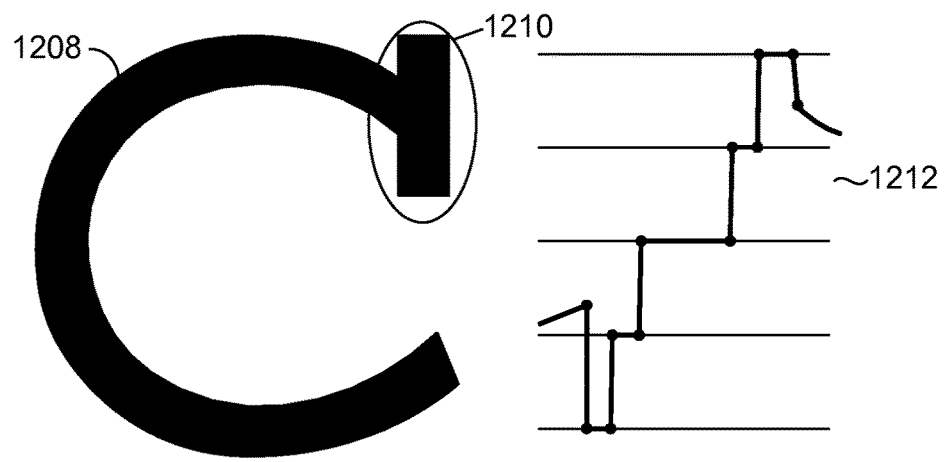

The detail shape for an identified detail area of a character image may be determined in one embodiment by computing the tangent direction encountered when walking along the outline of the identified area of the character image. For instance, FIG. 12A illustrates the tangent direction 1206 determined for the detail area 1204 on the bottom right of the character image 1202. FIG. 12B illustrates the tangent direction determined for the detail area 1210 on the top right of the character image 1208. By analyzing the shape of the resulting curve (e.g., comparing to known shapes), inflexion points, number of corners, and other features may be identified to determine the shape of the detail area.

In some embodiments, machine-learning techniques may be employed to identify a detail shape. For instance, neural networks could be trained using various detail shapes. The neural networks could then be used to analyze an identified area of a character image to classify the detail shape of that area.

Referring again to FIG. 7, geometric measurements defined by the model are determined, as shown at block 708. As discussed above, a model may include any number of additional geometric measurements. These may include, for instance, italic angle, width, density, contrast, and topology, to name a few. As discussed above, in some embodiments, the italic angle for a letterform may be defined based on a pair of keypoints. In such embodiments, the italic angle of the character image may be determined by measuring the angle between the vertical (or horizontal) and a line joining the two keypoints on the character image. As discussed above, the width of the character image may be determined relative to height of the character image. The density of the character image may be determined as the ratio of black pixels to the total area of the character image. The contrast may be determined as the ratio of the stroke width of the thickest part of the character image to the stroke width of the thinnest part of the character image. In some embodiments, the stroke width may be determined at various points along the skeleton by measuring the distance from the skeleton to a closest white pixel (e.g., using a distance transform). Topology may be determined by counting the number of fills and holes on the character image. As noted previously, the geometric measurements discussed herein are provided by way of example only and not limitation. Any of a variety of different geometric measurements may be employed within a model and determined for a character image.

As shown at block 710, a visual descriptor is generated for the character image. The visual descriptor includes information determined from blocks 702, 704, 706, and 708. This may include information identifying the letterform of the character image, keypoint locations, detail shapes for zero, one or more detail areas, and any geometric measurements made.

Figure 13:
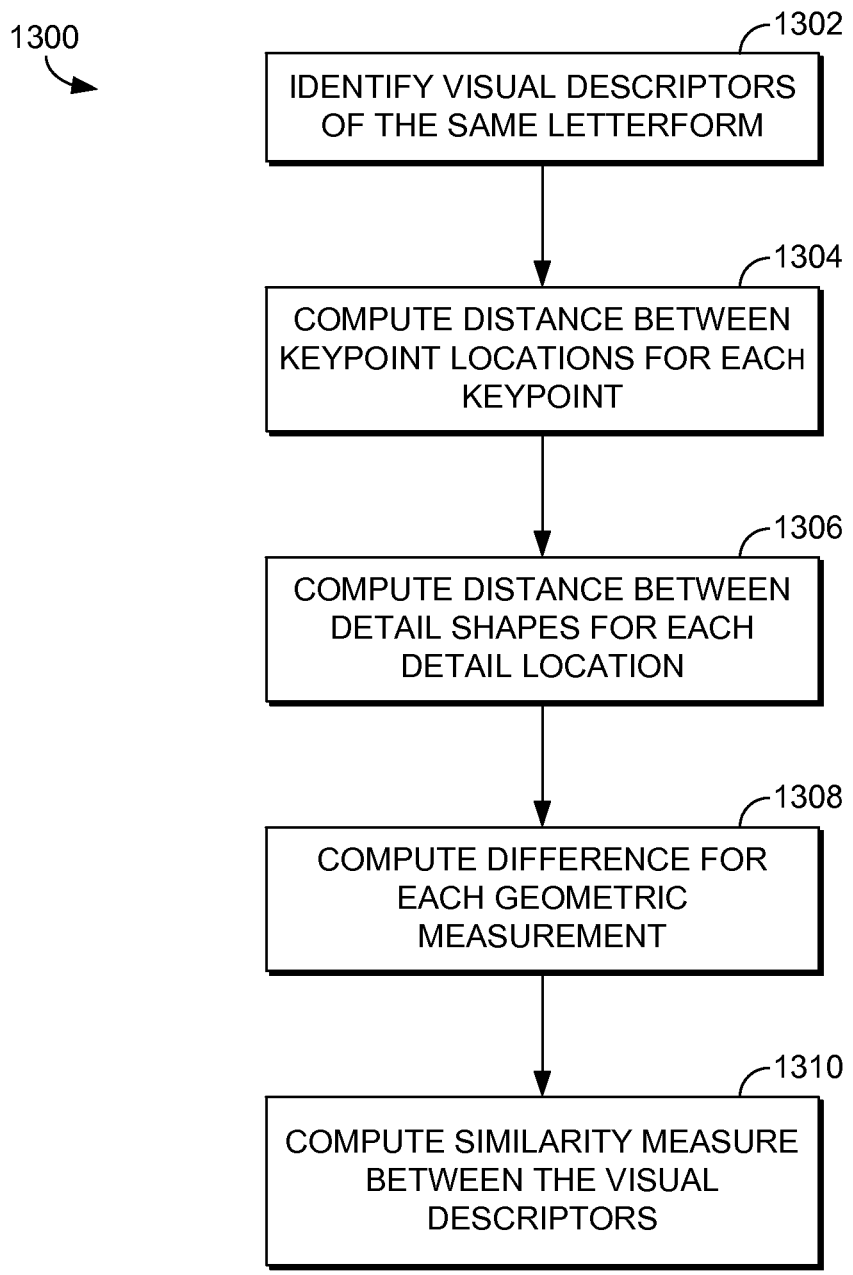
FIG. 13 is a flow diagram showing a method for computing the distance between visual descriptors of the same letterform in accordance with an embodiment of the present invention.

Referring now to FIG. 13, a flow diagram is provided that illustrates a method 1300 for comparing visual descriptors for two character images from different fonts in accordance with an embodiment of the present invention. The method 1300 may be performed, for instance, by the similarity module 106 of FIG. 1. As shown at block 1302, visual descriptors of the same letterform are identified. Because each visual descriptor may include information identifying a letterform, the visual descriptors of the same letterform may be identified simply by looking up the letterforms indicated in the visual descriptors.

Distances between keypoint locations are determined as shown at block 1304. Generally, for each keypoint, the distance is computed between the actual keypoint location in the first visual descriptor and the actual location of the corresponding keypoint in the other visual descriptor. In some embodiments, an overall distance measurement may be made for the keypoints in the visual descriptors, for instance, as a sum of the distances measured for each keypoint. In some instances, different weightings may be applied to the distances for various keypoints.

As shown at block 1306, the distance between the detail shapes for the two visual descriptors is determined for each detail area. Generally, the model may define distances between detail shapes, for instance, using a two-dimensional matrix indicating distances between each pair of detail shape options. Accordingly, for a given detail area, a distance may be determined by looking up the distance defined between the detail shapes included in the visual descriptors for that detail area. In some embodiments, if multiple detail areas are included, an overall distance measurement may be determined for the detail shapes in the two visual descriptors, for instance, as a sum of the distances measured for each detail area. In some instances, different weightings may be applied to the distances for various detail areas.

The difference for each geometric measurement is also determined, as shown at block 1308. This may simply include calculating the difference between the measures included in the two visual descriptors for each geometric measurement area.

A similarity measure that reflects the visual similarity of the character images corresponding with the two visual descriptors is determined at block 1310. In some embodiments, the similarity measure is computed as an overall distance between the two visual descriptors. The overall distance may be determined, for instance, as a sum of the differences/distances computed at blocks 1304, 1306, and 1308. In some instances, the various differences/distances may be weighted. Accordingly, the overall distance reflects the visual similarity between the character images corresponding with the two visual descriptors. For instance, a smaller distance may indicate that the character images are more visually alike.

It should be understood that any weightings applied in the method 1300 of FIG. 13 may be configurable. This may include, for instance, weightings applied in calculating an overall keypoint distance, overall details distance, and the overall distance between two visual descriptors. In some embodiments, the weightings may vary among letterforms. For instance, one measurement area may be a good indicator of visual similarity for one letterform and therefore may receive greater weighting for that letterform. The same measurement area may not be a good indicator of visual similarity for another letterform and therefore may receive less weighting for that letterform.

Figure 14:
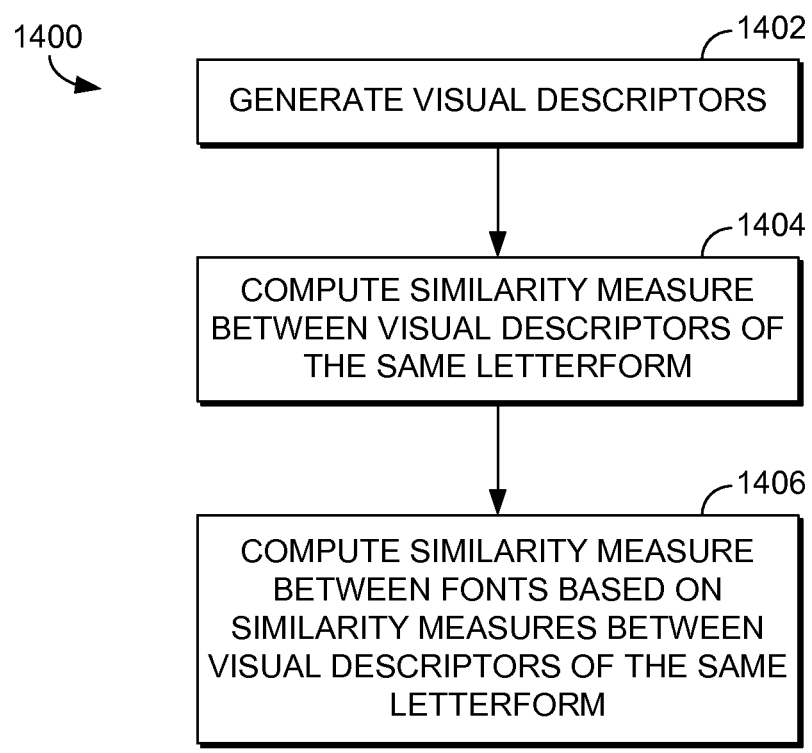
FIG. 14 is a flow diagram showing a method for determining the visual similarity between two fonts in accordance with an embodiment of the present invention.

Turning to FIG. 14, a flow diagram is provided that illustrates a method 1400 for computing a similarity measure that reflects the visual similarity between two fonts in accordance with an embodiment of the present invention. The method 1400 may be performed, for instance, by the font analysis system 100 of FIG. 1. As shown at block 1402, a set of visual descriptors are generated for each font based on character images in each font. The visual descriptors may be generated, for instance, using the method 700 of FIG. 7. In some instances, visual descriptors may be generated for a character image for every available letterform in each font. In other instances, visual descriptors may be generated for character images for only a portion of available letterforms. For instance, to assist in the speed of processing, character images for some letterforms may be selected while others ignored. In some instances, particular letterforms may be identified as providing a better indication of visual similarity and character images corresponding with those letterforms may be selected for generating visual descriptors.

A similarity measure is determined for each pair of visual descriptors from the two fonts that correspond with the same letterform, as shown at block 1404. The similarity measure between a pair of visual descriptors may be determined, for instance, using the method 1300 of FIG. 13. Generally, a pair of visual descriptors may be identified by selecting a visual descriptor from a first font that corresponds with a particular letterform and selecting a visual descriptor from the second font that corresponds with the same letterform. Similarity measures may be computed for all pairs of corresponding visual descriptors or only a portion of the available pairs. For instance, to assist in the speed of processing, visual descriptors for some letterforms may be selected while others ignored. In some instance, particular letterforms may be identified as providing a better indication of visual similarity and visual descriptors for those letterforms may be selected for determining similarity measures between the visual descriptors.

As shown at block 1406, a similarity measure for the two fonts is determined based on the similarity measures for the pairs of visual descriptors of the same letterform (computed at block 1408). The similarity measure provides an indication of the visual similarity of the two fonts. In some embodiments, the similarity measure for the two fonts is computed as a sum of the similarity measures for the pairs of corresponding visual descriptors. In some instances, weightings may be applied to the various similarity measures. For instance, greater weighting may be given to the similarity measures for visual descriptors for particular letterforms.

Figure 15:
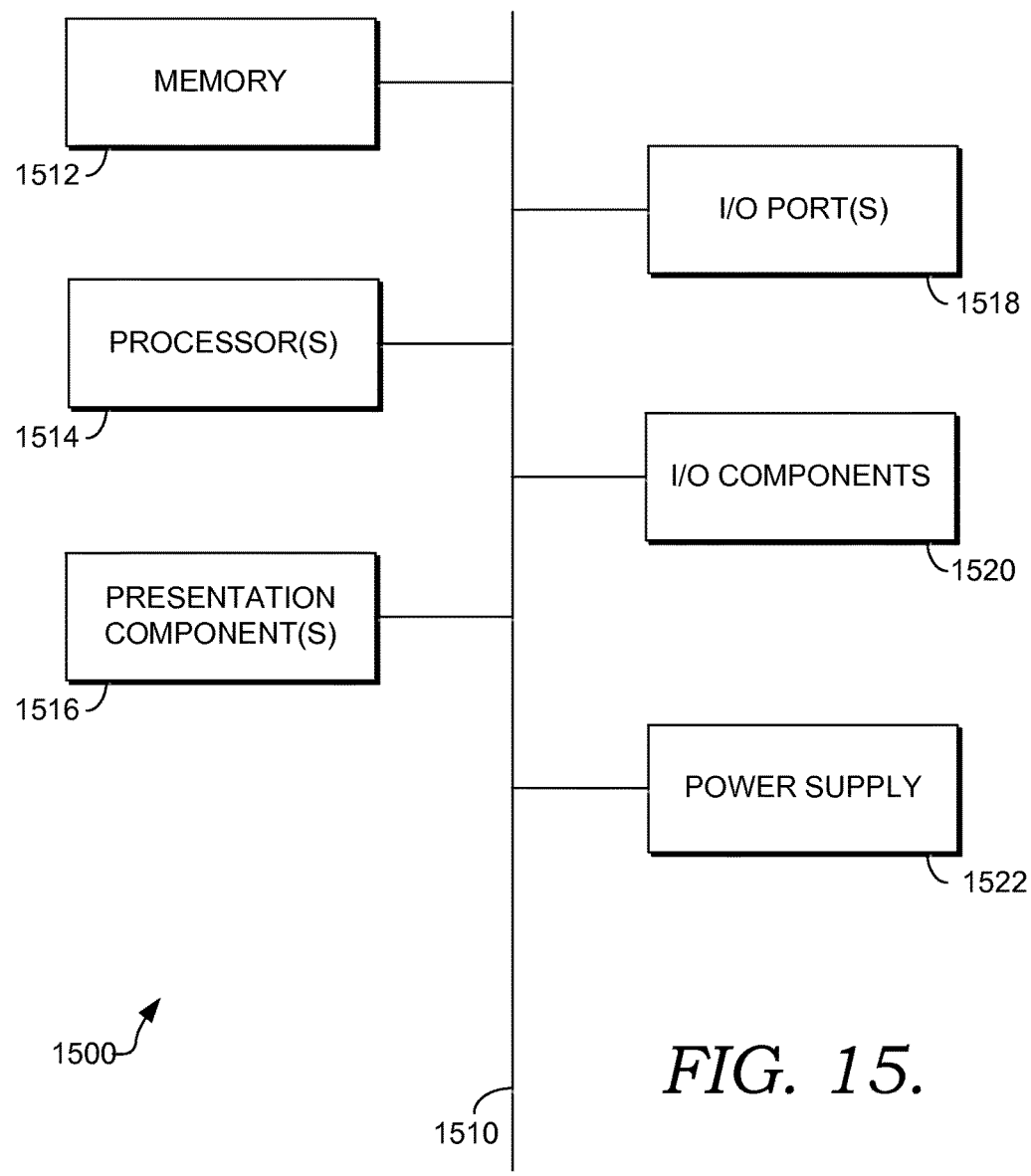
FIG. 15 is a block diagram of an exemplary computing environment suitable for use in implementing embodiments of the present invention.

Having described embodiments of the present invention, an exemplary operating environment in which embodiments of the present invention may be implemented is described below in order to provide a general context for various aspects of the present invention. Referring to FIG. 15 in particular, an exemplary operating environment for implementing embodiments of the present invention is shown and designated generally as computing device 1500. Computing device 1500 is but one example of a suitable computing environment and is not intended to suggest any limitation as to the scope of use or functionality of the invention. Neither should the computing device 1500 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 15, computing device 1500 includes a bus 1510 that directly or indirectly couples the following devices: memory 1512, one or more processors 1514, one or more presentation components 1516, input/output (I/O) ports 1518, input/output components 1520, and an illustrative power supply 1522. Bus 1510 represents what may be one or more busses (such as an address bus, data bus, or combination thereof). Although the various blocks of FIG. 15 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 15 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 15 and reference to "computing device."

Computing device 1500 typically includes a variety of computer-readable media. Computer-readable media can be any available media that can be accessed by computing device 1500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1500. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1512 includes computer-storage media in the form of volatile and/or nonvolatile memory. The memory may be removable, non-removable, or a combination thereof. Exemplary hardware devices include solid-state memory, hard drives, optical-disc drives, etc. Computing device 1500 includes one or more processors that read data from various entities such as memory 1512 or I/O components 1520. Presentation component(s) 1516 present data indications to a user or other device. Exemplary presentation components include a display device, speaker, printing component, vibrating component, etc.

I/O ports 1518 allow computing device 1500 to be logically coupled to other devices including I/O components 1520, some of which may be built in. Illustrative components include a microphone, joystick, game pad, satellite dish, scanner, printer, wireless device, etc. The I/O components 1520 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1500. The computing device 1500 may be equipped with depth cameras, such as, stereoscopic camera systems, infrared camera systems, RGB camera systems, and combinations of these for gesture detection and recognition. Additionally, the computing device 1500 may be equipped with accelerometers or gyroscopes that enable detection of motion. The output of the accelerometers or gyroscopes may be provided to the display of the computing device 1500 to render immersive augmented reality or virtual reality.

As can be understood, embodiments of the present invention provide for an objective approach for determining the visual similarity between fonts. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A non-transitory computer storage medium comprising computer-useable instructions that, when used by one or more computing devices, cause the one or more computing devices to perform operations for comparing fonts, the operations comprising:
    identifying a letterform of a character image from a first font, the letterform being selected from a set of letterforms defined by a model;
    determining locations of keypoints on the character image based on a set of model keypoints defined on the letterform in the model;
    determining a detail shape at each of one or more areas of the character image, each of the one or more areas of the character image comprising a portion of the outline of the character image corresponding with one or more detail areas defined for the letterform in the model;
    generating a visual descriptor for the character image that contains information regarding the letterform of the character image, the locations of the keypoints on the character image, and the one or more detail shapes;
    comparing the first font to a second font by computing a similarity measure for the visual descriptor and a second visual descriptor for a second character image from the second font, the character image and the second character image corresponding with a same letterform;
    selecting one or more fonts based on the similarity measure.

2. The non-transitory computer storage medium of claim 1, wherein the locations of the keypoints on the character image are determined by:
    extracting a skeleton of the character image; and
    positioning the keypoints on the skeleton based on locations of the model keypoints defined on the letterform in the model.

3. The non-transitory computer storage medium of claim 1, wherein determining a detail shape at each of one or more areas of the character image corresponding with one or more detail areas defined for the letterform in the model comprises:
    identifying a first area of the character image based on the locations of a subset of the keypoints on the character image corresponding with a subset of model keypoints identified in the model for defining a first detail area for the letterform; and
    analyzing an outline of the first area on the character image to determine a first detail shape for the first area.

4. The non-transitory computer storage medium of claim 1, wherein the operations further comprise:
    determining one or more geometric measurements of the character image; and
    wherein the visual descriptor includes information regarding the one or more geometric measurements of the character image.

5. The non-transitory computer storage medium of claim 4, wherein determining the one or more geometric measurements include determining an italic angle of the character image.

6. The non-transitory computer storage medium of claim 5, wherein determining the italic angle of the character image comprises:
    identifying a pair of keypoints on the character image corresponding with a pair of model keypoints on the letterform defined by the model for italic angle measurement; and
    determining the italic angle for the character image based on an angle between a horizontal line or vertical line and a line joining the pair of keypoints on the character image.

7. The non-transitory computer storage medium of claim 4, wherein determining the one or more geometric measurements include determining a width of the character image relative to a height of the character image.

8. The non-transitory computer storage medium of claim 4, wherein determining the one or more geometric measurements include determining a density of the character image as a ratio of black pixels of the character image to a total area of the character image.

9. The non-transitory computer storage medium of claim 4, wherein determining the one or more geometric measurements include determining a contrast of the character image as a ratio of a width of a thickest part of the character image to a width of a thinnest part of the character image.

10. The non-transitory computer storage medium of claim 4, wherein determining the one or more geometric measurements include determining a topology of the character image as a number of fills and holes of the character image.

11. A computer-implemented method for comparing fonts, the method comprising:
    identifying, by a computing device, a first visual descriptor and a second visual descriptor as corresponding with a same letterform, the first visual descriptor representing a first character image from a first font and including information regarding the letterform, locations of keypoints on the first character image, and a detail shape at each of one or more detail areas on the first character image, the second visual descriptor representing a second character image from a second font and including information regarding the letterform, locations of keypoints on the second character image, and a detail shape at each of one or more detail areas on the second character image, the one or more detail areas on the first character image and the one or more detail areas on the second character image corresponding to one or more detail areas defined by a model used to generate the first visual descriptor and the second visual descriptor;

comparing the first font to the second font by computing a similarity measure for the first visual descriptor and the second visual descriptor based on the information regarding the locations of keypoints on the first character image and the second character and the detail shape at each of the one or more areas on the first character image and the second character image; and selecting one or more fonts based on the similarity measure.

12. The method of claim 11, wherein computing the similarity measure for the first visual descriptor and the second visual descriptor comprises:

for each pair of corresponding keypoints on the first character image and the second character image, computing a distance between a location of the keypoint on the first character image and a location of the keypoint on the second character image.

13. The method of claim 12, wherein computing the distance between the first visual descriptor and the second visual descriptor comprises:

generating a sum of the distances computed for the pairs of corresponding keypoints on the first character image and the second character image.

14. The method of claim 12, wherein computing the similarity measure for the first visual descriptor and the second visual descriptor comprises:

for each pair of corresponding detail areas on the first character image and the second character image, computing a distance between a detail shape on the first character image and a detail shape on the second character image.

15. The method of claim 12, wherein the first visual descriptor includes information regarding a geometric measurement of the first character image and the second visual descriptor includes information regarding a geometric measurement of the second character image; and wherein the similarity measure for the first visual descriptor and the second visual descriptor is determined based on a difference between the geometric measurement of the first character image and the geometric measurement of the second character image.

16. The method of claim 15, wherein the geometric measurement comprises at least one selected from the following: an italic angle, a width, a density, a contrast, and a topology.

17. A computerized system comprising:
one or more processors; and
one or more computer storage media storing computer-useable instructions that, when used by the one or more processors, cause the one or more processors to:

generate a first set of visual descriptors for a plurality of character images from a first font, at least one visual descriptor in the first set of visual descriptors corresponding with a first character image from the first font and including information regarding a letterform of the first character image, locations of keypoints on the first character image, and a detail shape at each of one or more areas on the first character image corresponding to one or more detail areas defined by a model used to generate the first visual descriptor;

generate a second set of visual descriptors for a plurality of character images from a second font, at least one visual descriptor from the second set of visual descriptors corresponding with a second character image from the second font and including information regarding a letterform of the second character image, locations of keypoints on the second character image, and a detail shape at each of one or more areas on the second character image corresponding to the one or more detail areas defined by the model used to generate the second visual descriptor;

compute distances between pairs of visual descriptors from the first set of visual descriptors and the second set of visual descriptors that correspond with a same letterform;

compare the first font and the second font by computing a similarity measure for the first font and the second font as a function of the distances between the visual descriptors from the first set of visual descriptors and the second set of visual descriptors; and select one or more fonts based on the similarity measure.

18. The system of claim 17, wherein distances between pairs of visual descriptors are computed for only a subset of all available pairs of visual descriptors from the first set of visual descriptors and the second set of visual descriptors.

19. The system of claim 17, wherein the similarity measure is computed as a weighted sum of the distances between the visual descriptors from the first set of visual descriptors and the second set of visual descriptors.

* * * * *

UNITED STATES PATENT AND TRADEMARK OFFICE
CERTIFICATE OF CORRECTION

PATENT NO. : 10,127,199 B2
APPLICATION NO. : 14/229402
DATED : November 13, 2018
INVENTOR(S) : R. David Arnold et al.

Page 1 of 1

It is certified that error appears in the above-identified patent and that said Letters Patent is hereby corrected as shown below:

In the Specification

Column 10, Line 23: Please remove "or" and replace with --for--.

Signed and Sealed this
Fourth Day of June, 2019

Andrei Iancu
*Director of the United States Patent and Trademark Office*